(12) United States Patent
Staples et al.

(10) Patent No.: US 9,529,558 B2
(45) Date of Patent: Dec. 27, 2016

(54) MOBILE DOCUMENT GENERATION FROM A PRINT WORKFLOW

(71) Applicants: Eric T. Staples, Longmont, CO (US); Joseph W. Stradling, Firestone, CO (US)

(72) Inventors: Eric T. Staples, Longmont, CO (US); Joseph W. Stradling, Firestone, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/706,895

(22) Filed: May 7, 2015

(65) Prior Publication Data

US 2016/0328194 A1    Nov. 10, 2016

(51) Int. Cl.
*G06F 3/12* (2006.01)

(52) U.S. Cl.
CPC ........... *G06F 3/1275* (2013.01); *G06F 3/1243* (2013.01); *G06F 3/1246* (2013.01); *G06F 3/1292* (2013.01)

(58) Field of Classification Search
USPC ....................................................... 358/1.15
See application file for complete search history.

(56) References Cited

U.S. PATENT DOCUMENTS

| | | |
|---|---|---|
| 7,289,236 B2 | 10/2007 | Tanaka et al. |
| 7,647,074 B2 | 1/2010 | McCoog et al. |
| 8,539,342 B1 | 9/2013 | Lewis |
| 2009/0279137 A1 | 11/2009 | Mori |
| 2010/0271650 A1 | 10/2010 | Tomizawa et al. |
| 2011/0255111 A1* | 10/2011 | Oba ....................... G06F 3/1247 358/1.13 |
| 2012/0038940 A1* | 2/2012 | Boskovic .............. G06F 3/1206 358/1.13 |

(Continued)

FOREIGN PATENT DOCUMENTS

| | | |
|---|---|---|
| JP | 2011118586 | 6/2011 |
| JP | 2014059709 | 4/2014 |

OTHER PUBLICATIONS

Maximiliano Firtman: "Programming the Mobile Web", Aug. 2, 2010, O'Reilly, XP055218939, ISBN: 978-0-596-80778-8 pp. 104-105, 317-368, 469-470.

(Continued)

*Primary Examiner* — Ngon Nguyen
(74) *Attorney, Agent, or Firm* — Duft Bornsen & Fettig LLP

(57) ABSTRACT

Systems and methods for mobile document generation from a print workflow. One system is an apparatus that includes a workflow with an interface that receives a print job that defines multiple documents. The workflow server also includes a controller that directs devices of a print shop in accordance with a print workflow that comprises an ordered set of activities to perform upon the documents. The controller records content from the documents while the print job is being processed in the workflow for generating a mobile version of the documents. The controller also identifies a document for viewing on a mobile device, and identifies a template for generating the mobile version of the document. The controller further inserts the content recorded for the document into the template to generate the mobile version of the document, and provides the mobile version of the document to the mobile device.

20 Claims, 6 Drawing Sheets

(56) References Cited

U.S. PATENT DOCUMENTS

2012/0060087 A1 3/2012 Jame et al.
2012/0243028 A1* 9/2012 Dumitrescu .......... G06F 3/1275
  358/1.15
2014/0122241 A1 5/2014 Borucki et al.

OTHER PUBLICATIONS

Wikipedia: "Web template system", Internet Article, Feb. 17, 2015.
European Patent Office Search Report, Ricoh Company, Ltd. Appl No. 16167339.7-1958, May 31, 2016.

* cited by examiner

US 9,529,558 B2

MOBILE DOCUMENT GENERATION FROM A PRINT WORKFLOW

FIELD OF THE INVENTION

The invention relates to the field of printing systems, and in particular, to mobile document generation from a print workflow.

BACKGROUND

Print shops are generally capable of supplying printing services to meet a variety of customer demands. For example, print shops are often used to print documents for mass-mailing (e.g., customer bills, advertisements, etc.). Because print shops engage in printing on a scale that is hard to match, their customer base is often varied and may include both small businesses as well as large institutions (e.g., credit card companies, banks, etc.). Because print shops serve a variety of customers, they are often tasked with processing jobs that have varying printing formats, delivery dates, and media requirements.

Print shops often include a number of high-volume printers capable of printing incoming jobs quickly and at high quality as well as post-printing devices that are used to process the printed documents of each job (e.g., cutters, inserters, mailers, etc.). In addition, print shops may provide digital/web publishing, e-mail, or other multimedia services to customers. Print shops therefore often use a centralized server that coordinates activity between printers and other devices of the print shop. However, print shop operators continue to desire enhanced servers capable of managing print jobs that have complex requirements.

SUMMARY

Embodiments described herein provide for mobile document generation from a print workflow. A workflow server may extract certain types of data from documents of a print job for business needs. The documents are generally formatted for print and the data extracted from the documents may be used to generate a report for the transaction included in the document. However, since the documents of the print job are formatted for print, they may be difficult to view on a mobile device, such as a smart phone or tablet computer. The workflow server thus uses the data extracted from a document during processing through a workflow to generate a mobile version of the document that is optimized for viewing on a mobile device.

One embodiment is an apparatus that includes a workflow with an interface that receives a print job that defines multiple documents. The workflow server also includes a controller that directs devices of a print shop in accordance with a print workflow that comprises an ordered set of activities to perform upon the documents. The controller identifies properties of each of the documents to record while the print job is being processed in the workflow. The controller also identifies a document for viewing on a mobile device and identifies a template for the document. The controller further inserts properties recorded for the document while the print job processed in the workflow into the template to generate a mobile version of the document, and provides the mobile version of the document to the mobile device.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
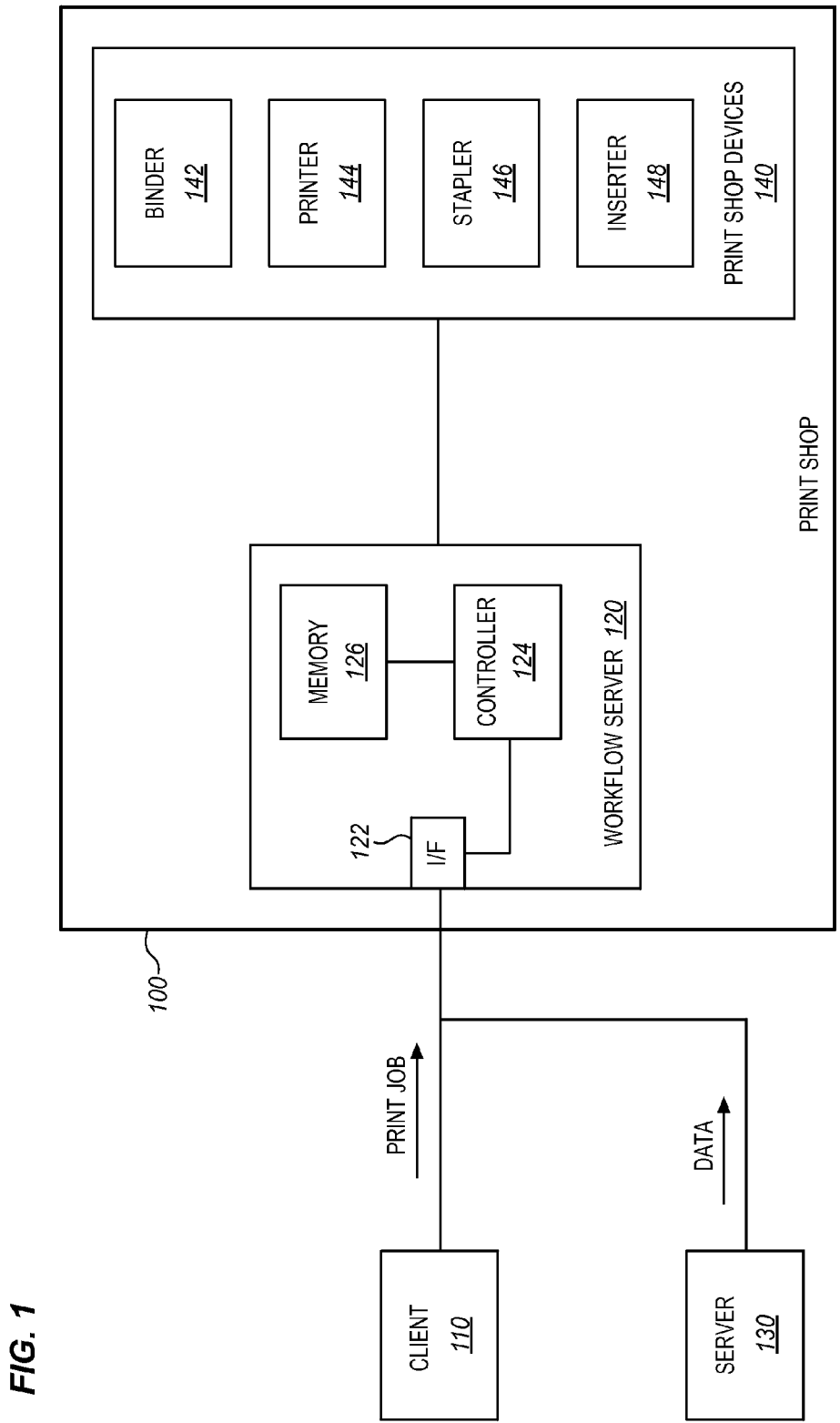
FIG. 1 is a block diagram of a workflow system in an exemplary embodiment.

FIG. 1 is a block diagram of a workflow system 100 in an exemplary embodiment. In workflow system 100, print data for an incoming job is received from client 110 at workflow server 120. Workflow server 120 reviews the incoming print job, and identifies a workflow for the print job. A workflow is an organized set of print shop activities to perform for the print job, such as printing, stapling, or binding. A workflow may be selected from pre-defined templates as desired. After a workflow has been chosen, workflow server 120 directs the devices of the print shop in accordance with the workflow to ensure that the print job is properly handled at the print shop.

Workflow system 100 has been enhanced to use the processing of documents through a workflow for generating a format of a document viewable on a mobile device, such as a smart phone or tablet computer. For example, workflow system 100 may process documents for businesses that have a need to track and report data relating to their services, either for generating reports, complying with industry-specific regulations, accounting, etc. As such, workflow system 100 may analyze data of incoming print jobs to record document properties which are stored for the print job for later use. Previous workflow systems may use recorded document properties to generate reports but the documents themselves are formatted for printing and thus are provided to customers to view in print format. However, documents in a print format may be difficult to view digitally on the smaller form factor of a mobile device. Workflow system 100 is therefore enhanced to use the recorded document properties so that documents which are formatted for print may be made more easily viewable on mobile devices.

Workflow server 120 includes an interface 122 (e.g., an Ethernet interface, wireless interface, etc.) for receiving print data for print jobs from client 110. Workflow server 120 further includes a controller 124 for managing print jobs received at workflow server 120, and a memory 126 (e.g., Random Access Memory (RAM), a hard disk, etc.) for storing print jobs from client 110 and/or document properties of documents within the print job.

Print shop devices 140 include the devices and components of the print shop that perform the various activities described herein. For example, print shop devices 140 may include printers, post-printing machinery, e-mail or web publishing servers, etc. The print shop devices illustrated in FIG. 1 (binder 142, printer 144, stapler 146, and inserter 148) provide an example of the variety of print shop devices that may be utilized by a print shop. In this embodiment, binder 142 operates to bind printed pages into magazines or books, printer 144 operates to rasterize and print incoming print data onto physical pages, stapler 146 staples groups of pages together, and inserter 148 inserts physical pages into envelopes for delivery to recipients.

Server 130 may store data that is relevant to the creation of a mobile version of a document in the print job that is separate from data included in the print job itself. In an embodiment where each print job includes hundreds of thousands of bank statements, server 130 may be an independent banking server that stores data for individual account holders. Server 130 comprises any system or component accessible to workflow server 120, and may access a shared file system also available to workflow server 120. In one embodiment, server 130 is external to the print shop. For example, server 130 may be physically separated from the print shop itself, or may be external to a network of the print shop and therefore accessible via the Internet.

Figure 2:
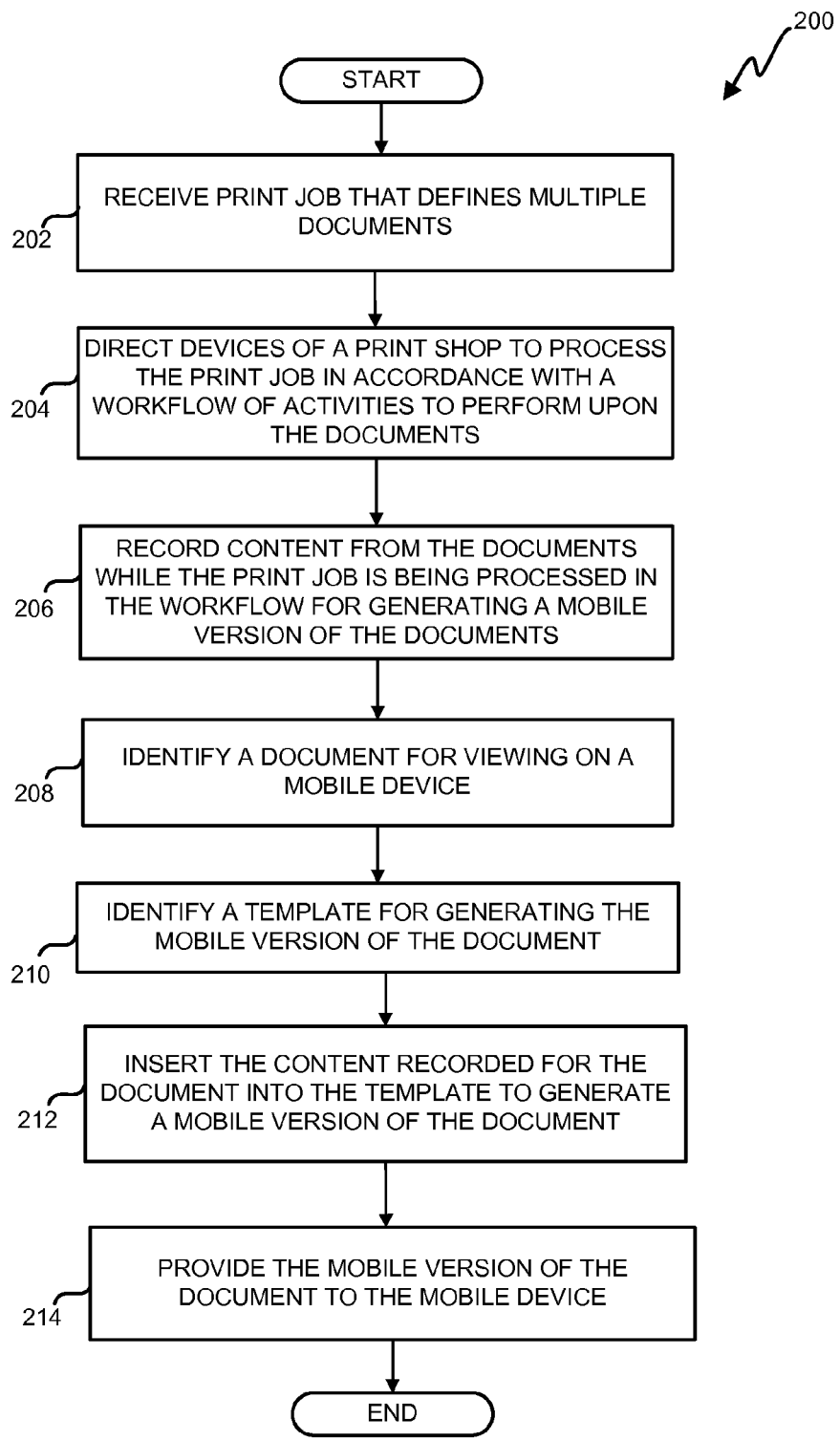
FIG. 2 is a flowchart illustrating a method for operating the workflow system in an exemplary embodiment.

Illustrative details of the operation of workflow system 100 will be discussed with regard to FIG. 2. Assume, for this embodiment, that client 110 has generated a print job for processing by the print shop, and has transmitted print data for the print job to workflow server 120. FIG. 2 is a flowchart illustrating a method 200 for operating a workflow system in an exemplary embodiment. The steps of method 200 are described with reference to workflow system 100 of FIG. 1, but those skilled in the art will appreciate that method 200 may be performed in other systems. The steps of the flowcharts described herein are not all inclusive and may include other steps not shown. The steps described herein may also be performed in an alternative order.

At step 202, interface 122 receives a print job that includes multiple documents from client 110. Each of the documents may indicate an intended recipient for delivery. That is, a job ticket for the print job may identify a recipient for each document, or each document may include print data that identifies a recipient. As used herein, a "document" is an independent portion of a print job that is directed to a specific recipient for delivery (e.g., a single piece of mail). Thus, multiple documents may be defined in a single file of print data. For example, a print job may include thousands of bank statements where each bank statement is intended for delivery to a different account holder and thus each bank statement comprises a separate document in the print job. The print data for the print job may be received in step 202 in a variety of formats, including but not limited to, Page Description Language (PDL) print data, such as an Advanced Function Presentation (AFP) datastream, a Portable Document Format (PDF) print data accompanied by JDF job ticket instructions, PostScript, etc.

At step 204, controller 124 directs devices of the print shop to process the print job in accordance with a workflow of activities to perform upon the documents. Controller 124 may select a workflow (e.g., from workflows stored in memory 126) for the print job in a variety of ways. For example, controller 124 may select a workflow based on a name of the print job, the client that submitted the print job, and/or the interface which received the print job. Workflow system 100 may implement multiple "hot folders" or interfaces that are each associated with a different workflow, and client 110 may submit a print job to one of the hot folders at workflow server 120 in order to indicate a desired workflow.

The workflow comprises the digitally defined order of operations to perform at the print shop in order to handle a print job. Controller 124 manages processing of the print job based on the ordered set of activities in the selected workflow. Each activity in a workflow may be associated with a category or type of print shop device (e.g., post-processing devices, printers, inserters) and may also be associated with specific named print shop devices. These activities may include printing or non-printing activities (e.g., billing, shipping, document review, multimedia/digital/internet activities, credit checks, etc.) as desired.

In step 206, controller 124 records content from the documents while the print job is being processed in the print workflow for generating a mobile version of the documents. The content, also referred to herein as a document property, refers to content in the print data of a document, such as an account balance, a check number, a transaction history, etc. A document property may comprise a key-value pair, that is, a keyword of the document property (e.g., "account.balance") and a value associated with the keyword of that document (e.g., "$1,500.00").

Controller 124 may identify a document property to record in memory 126 based on an activity in the workflow, an identity of client 110, the type of print job, the type of document in the print job (e.g., bank statement, credit card statement, etc.) and/or a recipient of the document (e.g., account number, recipient name, telephone number, etc.). For example, a workflow may comprise an activity that directs controller 124 to manage and/or perform data mining for a particular set of document properties (e.g., "account.number", "statement.date", etc.) for a particular type of document (e.g., billing statement) in the print job. Thus, controller 124 may identify the print job as a statements type print job and/or identify which type of transaction is defined by the document to determine which content or document properties to extract for a document in the print job. Alternatively or additionally, a workflow step in the print workflow may comprise a mobile document generation step that identifies specific content to extract from documents in the print job to be used for mobile document generation. Controller 124 may manage a database that associates the tracked/recorded document properties, the document, the document type, recipients of the document, the print job, and/or the client that submitted the print job.

In step 208, controller 124 identifies a document for viewing on a mobile device. Controller 124 may identify the document via a request to view a document in a mobile format and/or via a determination that a mobile version of the document is to be generated based on an activity in the workflow, an identity of client 110, the type of print job, the type of document or type of transaction defined by the document (e.g., bank statement, insurance policy document, credit report, etc.), and/or a recipient of the document (e.g., account number, recipient name, telephone number, etc.).

Requests for mobile documents may be received directly by workflow server 120 or workflow server 120 may receive requests via external servers (e.g., server 130) that handle requests for mobile documents for the print shop via the internet. Controller 124 may correlate the submitter of the request with the document and/or the request itself may identify the document. In one embodiment, a user may enter login credentials for an account managed by server 130 and workflow server 120 interacts with server 130 to associate the user with one or more documents of a print job submitted to workflow server 120. Controller 124 may identify documents the customer may view based on the login credentials or an access level of the user and present a selectable list of viewable documents to the user via server 130 that communicates with the user or mobile device. Server 130 may communicate the selectable list to the requester using a secure website, email, or mobile application of the mobile device associated with the user and relay the selection to workflow server 120.

In step 210, controller 124 identifies a template for generating the mobile version of the document. The template may comprise a Hypertext Markup Language (HTML) template or other type of template stored in memory 126 that enables a customizable layout of an electronic source document for viewing on a mobile device. Controller 124 may determine which template to use based on information stored in memory 126 that correlates the document and/or the document type with a particular template. For example, instructions or a database in memory 126 may associate bank statement documents with a specific template stored in memory 126 configured to format bank statement documents for viewing on a mobile device. Alternatively or additionally, controller 124 may determine which template to use based on information stored in memory 126 that correlates the print job, the client that submitted the print job, and/or a recipient of the document with a particular template.

In step 212, controller 124 inserts the content recorded for the document into the template to generate the mobile version of the document. The template may include tags that identify the content (e.g., one or more document properties stored for the document during processing of the print job) which is to be included in the mobile version of the document. Each tag in the template may identify at least one document property (e.g., keyword) and a location to insert a value associated with the document property into the template. A tag may define a boundary, size, and/or style (e.g., font, etc.) to format the document property value.

Controller 124 may analyze the template for tags and populate the template by replacing the tags with values of corresponding content recorded for that document. That is, controller 124 may determine a match between a tag and a document property recorded in memory 126 during processing of the document in the workflow, retrieve the value associated with the document property, and insert the value into the template using the formatting definitions of the tag. After each tag in the template has been replaced or substituted with a corresponding content value, controller 126 may store the template as a mobile version of the document.

In step 214, controller 124 provides the mobile version of the document to the mobile device. For example, after controller 124 substitutes each of the tags with corresponding values into the template without error, it may provide the resulting HTML document to the mobile device associated with the request to view the mobile version of the document. The request or user account associated with the document may identify contact information (e.g., email address, telephone number, etc.) and preferred contact method (e.g., email, text, proprietary mobile application, etc.) for receiving the mobile version of the document. Alternatively or additionally, the request or user account may indicate a specific device or characteristic of the mobile device that is to receive the mobile document for optimizing the completed mobile version for viewing. Workflow server 120 may submit the mobile version of the document to the user directly or make the mobile version of the document available via server 130.

Method 200 provides a benefit over prior systems and techniques, because it allows for a workflow server 120 to provide documents which are formatted for print to be more easily viewed on mobile devices, such as smart phones and tablet computers. Thus, document data which is extracted from the document as part of the print management workflow may be used to automatically generate a custom-formatted document for users that wish to view data related to their account in a mobile-friendly format.

In one embodiment, a file may be sourced from an external server (even one that did not originally create the print job), such as server 130 for use by the company that manages the accounts. As such, server 130 may provide additional document properties such as logos or other formatted graphics/text that may be used by controller 124 to insert into mobile documents associated with a particular client or print job. Alternatively or additionally, server 130 may provide a file that identifies account holder preferences, templates, template instructions, etc.

Examples

In the following examples, additional processes, systems, and methods are described in the context of a workflow system that prints account statements for mass-mailing to customers.

In this example, a workflow server operates on a computer of the print shop that is accessible via the Internet. The workflow server accesses print shop devices via an internal print shop intranet, to which a printer, e-mail server, and inserter of the print shop are connected. An incoming print job is received at the workflow server via the Internet as a PDF print job that includes seven hundred thousand documents. Each of the documents corresponds with a bank statement for a different account holder, and is a mail piece intended for delivery to a different recipient. A controller at the workflow server loads the print job into memory, and determines that the print job is a "statements" type of print job. The controller then assigns a workflow to the print job based on the type of job.

A controller of the workflow server reviews the workflow, and completes a receive step when the print job has been successfully loaded into memory at the workflow server. During or after the receive step, the controller analyzes the PDF print data for the print job to identify each mail piece within the print job, and to extract an account number from each of the mail pieces. The controller reviews the activities defined in the workflow, and determines a list of document properties to track for the workflow. The controller processes the documents through the workflow to print, insert, and/or mail the documents. In addition, the controller extracts print data from each of the documents to store the document properties indicated on the list in memory for each document.

Figure 3:
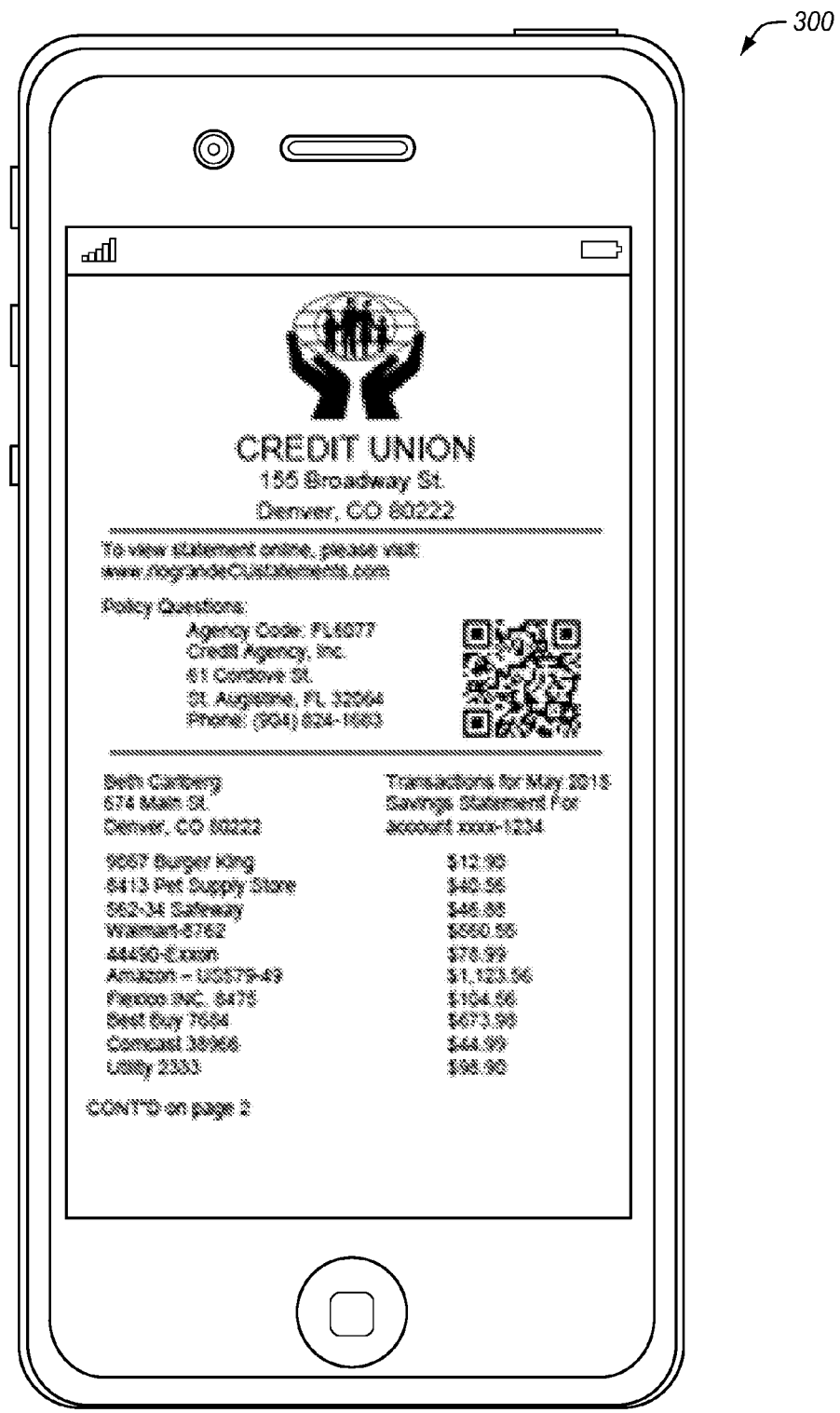
FIG. 3 illustrates a mobile device viewing a document formatted for print in an exemplary embodiment.

Suppose, for example, that at some point during or after processing the print job, an account holder requests to view a digital version of his or her bank statement on a mobile device. FIG. 3 illustrates a mobile device 300 viewing a document formatted for print in an exemplary embodiment. When the controller is not enhanced to use stored/tracked document properties to generate a mobile version of the document, the controller responds to the user's request for the document by providing the PDF version of the document to the user. As shown in FIG. 3, though some documents formatted for print such as PDF may be viewed on mobile platforms, it may be difficult to view the content of the document and the user may need to zoom and/or scroll many times to view the relevant portions of the document on the mobile device 300.

Figure 4:
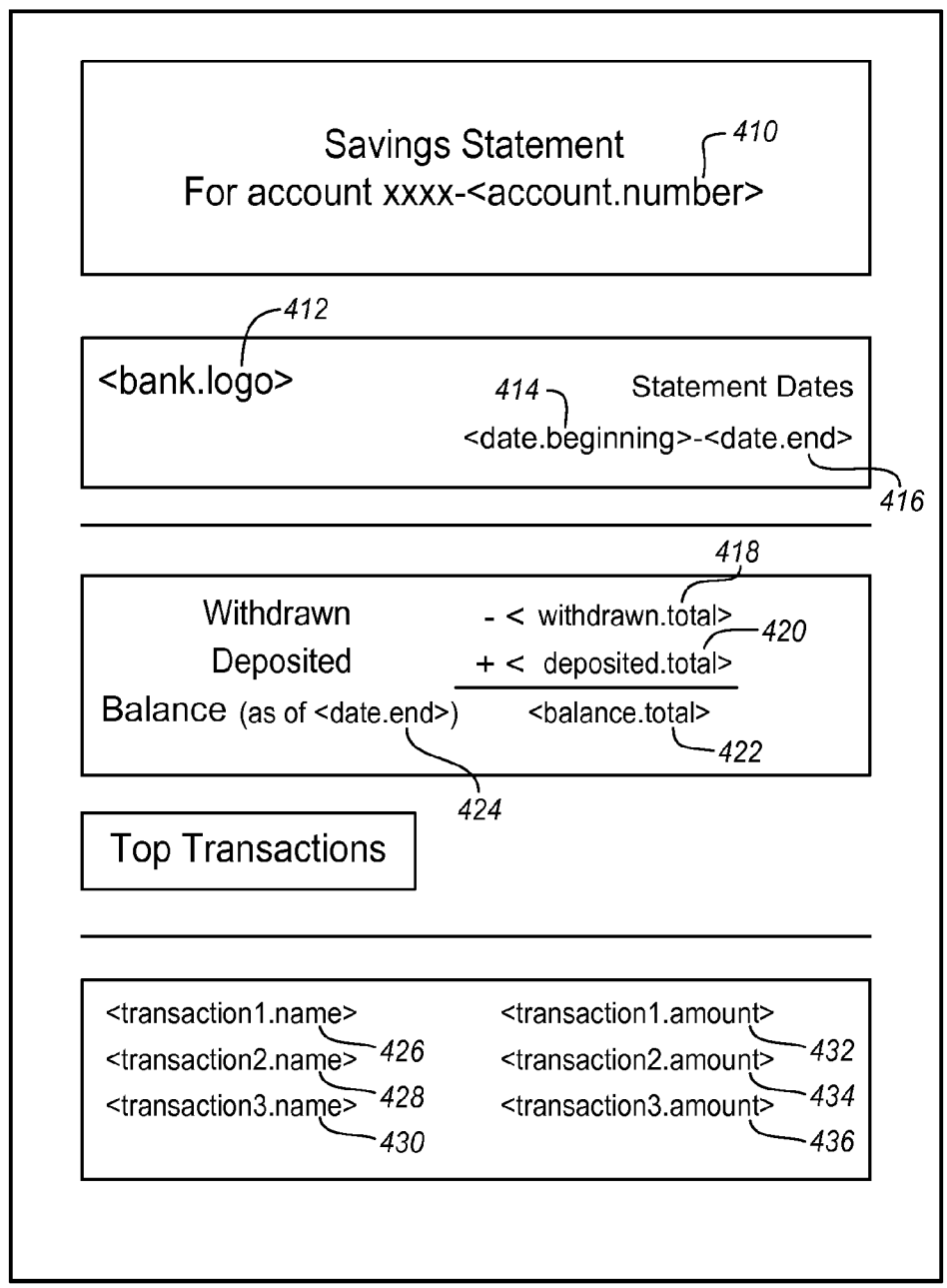
FIG. 4 illustrates a template for mobile document generation in an exemplary embodiment.

Therefore, workflow server 120 is enhanced with controller 124 to use stored/tracked content, or document properties, to generate a mobile version of the document. Suppose, for example, that an administrator of workflow server 120 has received (e.g., from client 110 or server 130) or configured a template to be used for bank statements. FIG. 4 illustrates an HTML template 400 for mobile document generation in an exemplary embodiment. Assume, for this example, that controller 124 automatically selects HTML template 400 for generating a mobile version of the document after it has determined that the document requested for mobile viewing is a bank statement type document that is associated with HTML template 400 in memory 126.

As shown in FIG. 4, HTML template 400 includes a document formatted with text and/or graphics of a particular format. Additionally, template 400 includes tags 410-436 that define a format and an insertion location of a document property using a suitable keyword. The keywords generally match the name of at least a portion of the document properties which were previously recorded during processing of the document through the workflow.

Controller 124 analyzes tags 410-436 of HTML template 400 to retrieve from memory 126 values of document properties that match the corresponding keyword of tags 410-436. Controller 124 replaces the tags 410-436 of the HTML template 400 with the corresponding values from memory 126. Some document properties, such as bank logo 412 may be stored in memory 126 separately from the document properties stored during processing through the workflow.

Figure 5:
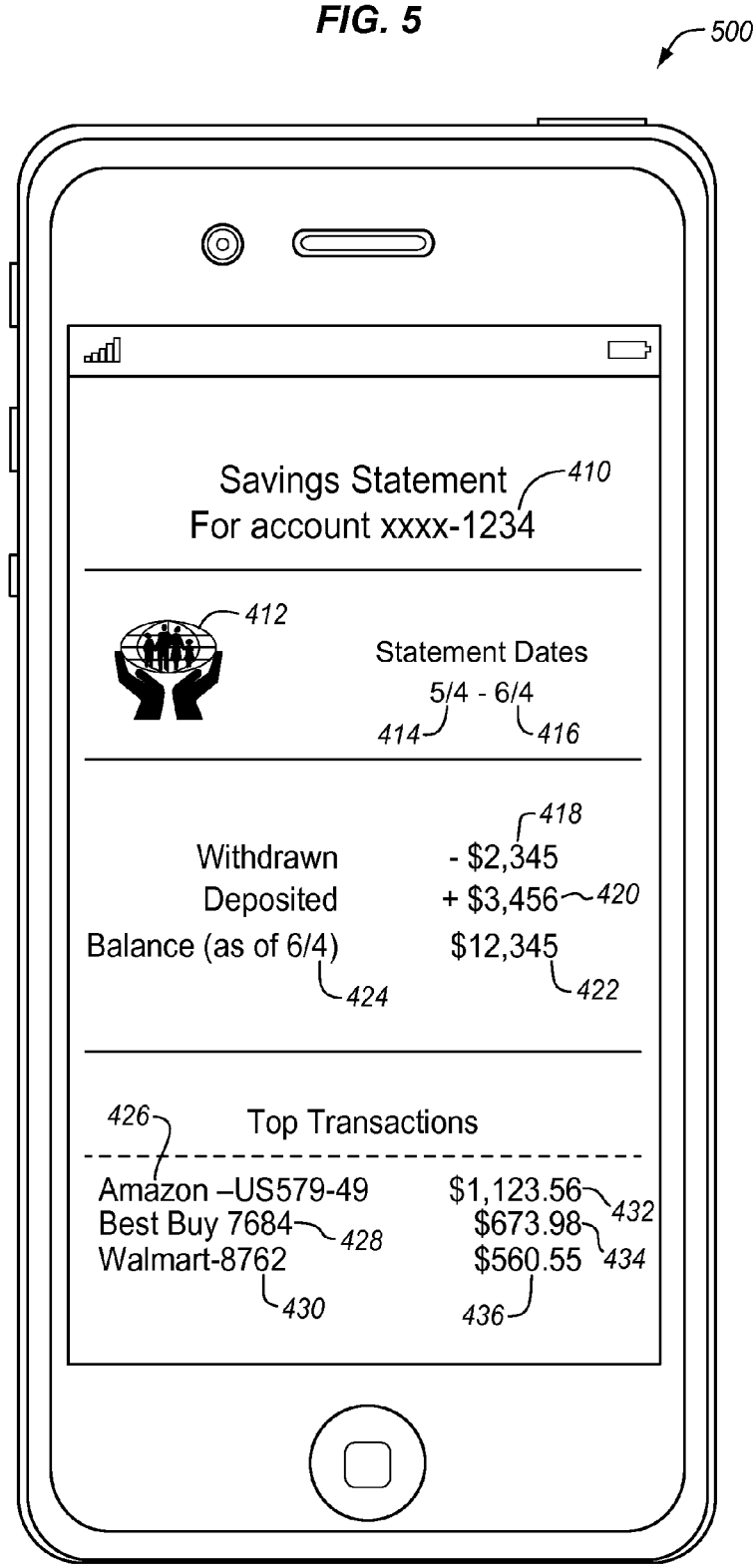
FIG. 5 illustrates a mobile device viewing a mobile optimized version of the document of a print job submitted to a workflow system in an exemplary embodiment.

FIG. 5 illustrates a mobile device 500 viewing a mobile optimized version of the document in a print job submitted to workflow system 120. As shown in FIG. 5, HTML template 400 is populated with data from the print job by searching for and replacing tags 410-436 with actual values stored in memory 126 stored during processing the document through the print workflow. The tags 410-436 of HTML template 400 provide a format for the values inserted into the template. In this instance, the tags 410-436 identify the document properties which may be most relevant to a mobile user that wishes to use their bank statement in a mobile format. Therefore, extraneous information which may be included in the document in the print formatted version of the document may be excluded to optimize the viewing space for viewing the mobile version of the document.

Figure 6:
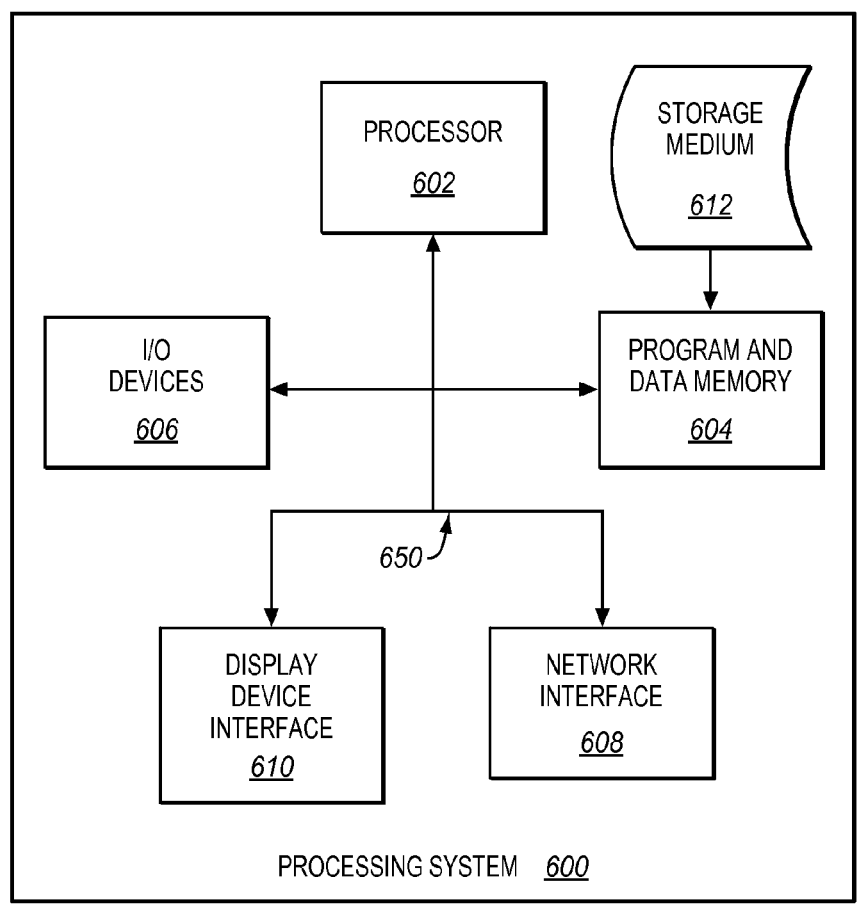
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of controller 124 to perform the various operations disclosed herein. FIG. 6 illustrates a processing system 600 operable to execute a computer readable medium embodying programmed instructions to perform desired functions in an exemplary embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the inventive concepts is not limited to those specific embodiments. The scope of the inventive concepts is defined by the following claims and any equivalents thereof.

We claim:

1. An apparatus comprising:
   a workflow server comprising:
      an interface configured to receive a print job that defines multiple documents; and
      a controller configured to direct devices of a print shop in accordance with a print workflow that comprises an ordered set of activities to perform upon the documents, and to record content from the documents while the print job is being processed in the workflow for generating a mobile version of the documents;

wherein the controller is configured to identify a document for viewing on a mobile device, to identify a template for generating the mobile version of the document, to insert the content recorded during processing of the document in the workflow into the template to generate the mobile version of the document, and to provide the mobile version of the document to the mobile device.

2. The apparatus of claim 1 wherein:
the template comprises a Hypertext Markup Language (HTML) document that includes tags that correspond with the content recorded for the document while the print job is being processed in the workflow; and
the controller is configured to insert the content into the template based on formatting definitions of the tags.

3. The apparatus of claim 1 wherein:
the controller is configured to identify the content of each of the documents to record based on an activity in the workflow selected for the print job.

4. The apparatus of claim 1 wherein:
the controller is configured to identify the template based on a type of transaction defined by the document.

5. The apparatus of claim 4 wherein:
the document comprises a billing statement; and
the controller is configured to identify the template based on a determination that the document is a billing statement.

6. The apparatus of claim 4 wherein:
the controller is configured to select the template among a plurality of templates based on the type of transaction defined by the document, to determine a match exists between one or more tags in the template and one or more document property values extracted from the document previously during processing of the document in the workflow, and to insert the one or more document property values into the template based on the formatting definitions of the one or more tags.

7. The apparatus of claim 1 wherein:
the controller is configured to provide a list of documents viewable on the mobile device based on login credentials associated with the mobile device.

8. The apparatus of claim 7 wherein:
the controller is configured to interface with an external server to retrieve the login credentials associated with the mobile device.

9. A method comprising:
receiving, at an interface, a print job that defines multiple documents;
directing, with a controller, devices of a print shop in accordance with a print workflow that comprises an ordered set of activities to perform upon the documents;
recording, with the controller, content from the documents while the print job is being processed in the workflow for generating a mobile version of the documents;
identifying, with the controller, a document for viewing on a mobile device;
identifying, with the controller, a template for generating a mobile version of the document;
inserting, with the controller, the content recorded during processing of the document in the workflow into the template to generate the mobile version of the document; and providing, with the controller, the mobile version of the document to the mobile device.

10. The method of claim 9 wherein:
the template comprises a Hypertext Markup Language (HTML) document that includes tags that correspond with one or more of the content recorded for the document while the print job is being processed in the workflow; and
the method further comprises:
inserting the content recorded for the document into the template based on formatting definitions of the tags.

11. The method of claim 9 further comprising:
identifying the content of each of the documents to record based on an activity in the workflow selected for the print job.

12. The method of claim 9 further comprising:
identifying the template based on a type of transaction defined by the document.

13. The method of claim 9 further comprising:
identifying the document based on a request received by the interface to view the document on the mobile device.

14. The method of claim 9 further comprising:
providing a list of documents viewable on the mobile device based on login credentials associated with the mobile device.

15. A non-transitory computer readable medium embodying programmed instructions which, when executed by a processor, are operable for performing a method comprising:
receiving a print job that defines multiple documents;
directing devices of a print shop in accordance with a print workflow that comprises an ordered set of activities to perform upon the documents;
recording content from the documents while the print job is being processed in the workflow for generating a mobile version of the documents;
identifying a document for viewing on a mobile device;
identifying a template for generating a mobile version of the document;
inserting the content recorded during processing of the document in the workflow into the template to generate the mobile version of the document; and
providing the mobile version of the document to the mobile device.

16. The medium of claim 15 wherein:
the template comprises a Hypertext Markup Language (HTML) document that includes tags that correspond with the content recorded for the document while the print job is being processed in the workflow; and
the method further comprises:
inserting the content recorded for the document into the template based on formatting definitions of the tags.

17. The medium of claim 15 wherein the method further comprises:
identifying the content of each of the documents to record based on an activity in the workflow selected for the print job.

18. The medium of claim 15 wherein the method further comprises:
identifying the template based on a type of transaction defined by the document.

19. The medium of claim 15 wherein the method further comprises:
identifying the document based on a request received by the interface to view the document on the mobile device.

20. The medium of claim 15 wherein the method further comprises:
   providing a list of documents viewable on the mobile device based on login credentials associated with the mobile device.

\* \* \* \* \*